United States Patent
Graham et al.

(10) Patent No.: US 10,712,103 B2
(45) Date of Patent: Jul. 14, 2020

(54) HEAT SHIELD AND A HEAT SHIELD ASSEMBLY

(71) Applicant: Zircotec IP Limited, Abingdon Oxfordshire (GB)

(72) Inventors: Terence Graham, Abingdon Oxfordshire (GB); Peter Whyman, Abingdon Oxfordshire (GB)

(73) Assignee: Zircotec IP Limited, Oxfordshire (GB)

( * ) Notice: Subject to any disclaimer, the term of this patent is extended or adjusted under 35 U.S.C. 154(b) by 3 days.

(21) Appl. No.: 15/549,054

(22) PCT Filed: Feb. 11, 2016

(86) PCT No.: PCT/GB2016/050333
§ 371 (c)(1),
(2) Date: Aug. 4, 2017

(87) PCT Pub. No.: WO2016/128757
PCT Pub. Date: Aug. 18, 2016

(65) Prior Publication Data
US 2018/0031335 A1    Feb. 1, 2018

(30) Foreign Application Priority Data

Feb. 13, 2015   (GB) ..................... 1502430

(51) Int. Cl.
*F28F 3/04*   (2006.01)
*B60R 13/08*   (2006.01)
*F28F 21/04*   (2006.01)

(52) U.S. Cl.
CPC .......... *F28F 3/044* (2013.01); *B60R 13/0876* (2013.01); *F28F 21/04* (2013.01); *F28F 2270/00* (2013.01)

(58) Field of Classification Search
CPC ........ F28F 3/044; F28F 21/04; F28F 2270/00; F01N 13/148; F01N 13/14; F01N 2310/14; B60R 13/0876
(Continued)

(56) References Cited

U.S. PATENT DOCUMENTS 1,987,798 A * 1/1935 Ruppricht ............... F16L 59/07
                                                    261/112.2
4,609,067 A * 9/1986 Gonwa .................... F01N 13/14
                                                    126/83
(Continued)

FOREIGN PATENT DOCUMENTS

| GB | 2459389 A | 10/2009 |
|---|---|---|
| KR | 101420398 B1 | 7/2014 |
| WO | 2014198772 A1 | 12/2014 |

OTHER PUBLICATIONS

"Spray-On Ceramic Coating Dramatically Reduces External Temperatures" by Mike Hanlon Accessible at: https://newatlas.com/spray-on-ceramic-coating-drannatically-reduces-external-tennperatures/6642/ (Year: 2006).*
(Continued)

*Primary Examiner* — Justin M Jonaitis
(74) *Attorney, Agent, or Firm* — Wood, Phillips, Katz, Clark & Mortimer

(57) ABSTRACT

A heat shield (10) comprises a metal sheet (12) with a thermal sprayed layer of ceramic material (14) thereon, the sheet (12) defining an array of dimples (16) and/or pimples (18) such that any notional plane intersecting the coated surface of the metal sheet (12) creates a notional line of intersection which intersects at least some dimples (16) and/or pimples (18).

33 Claims, 9 Drawing Sheets

(58) Field of Classification Search
USPC .................. 60/320; 165/135; 428/138, 937
See application file for complete search history.

(56) References Cited

U.S. PATENT DOCUMENTS

| | | | | |
|---|---|---|---|---|
| 4,950,627 | A * | 8/1990 | Tokarz | C04B 28/26 |
| | | | | 106/602 |
| 5,196,253 | A * | 3/1993 | Mueller | B32B 3/266 |
| | | | | 181/211 |
| 5,280,142 | A * | 1/1994 | Keller | F01N 13/14 |
| | | | | 126/83 |
| 5,670,264 | A * | 9/1997 | Sheridan | E04B 1/78 |
| | | | | 428/594 |
| 5,958,603 | A * | 9/1999 | Ragland | B60R 13/08 |
| | | | | 428/595 |
| 9,297,596 | B2 * | 3/2016 | Lehr | B32B 5/22 |
| 2002/0098316 | A1 * | 7/2002 | Butler | B32B 3/266 |
| | | | | 428/72 |
| 2003/0101719 | A1 * | 6/2003 | Farkas | F01N 13/102 |
| | | | | 60/323 |
| 2012/0034431 | A1 * | 2/2012 | Caprioli | F16L 59/026 |
| | | | | 428/195.1 |

OTHER PUBLICATIONS

Anonymous "applications—Power train—Heat shields", The Aluminium Automotive Manual (2011).
International Search Report and Written Opinion dated May 25, 2016.

* cited by examiner

HEAT SHIELD AND A HEAT SHIELD ASSEMBLY

The invention relates to a heat shield and heat shield assembly.

An example of a known heat shield is disclosed in GB2459389A to the present applicant. This relates to a heat shield for an exhaust for a vehicle such as a car or motorcycle. The heat from the exhaust and associated engine, particularly on performance vehicles, is such that there is the potential for heat damage to surrounding components, and a risk of setting fire to combustible materials, such as dry grass coming into contact with the system, as well as the risk of skin burns to any person coming into contact with the hot system. A mild steel exhaust pipe is disclosed which is plasma sprayed with a bond coat of nickel 3% aluminium followed by a 50/50 wt % mixture of titanium dioxide and magnesium zirconate to a thickness of 200 microns.

Another known heat shield is disclosed in WO2010/116159 also in the name of the present applicant. This relates to a flexible heat shield. In one embodiment, an aluminium foil is thermally sprayed through a 3 mm×3 mm mesh with an aluminium bronze bond coat. A magnesium zirconate layer is then sprayed on to the bond coat through the mesh. When the mesh is removed, the resulting coating comprises an array of square elements with dimensions of about 2 mm×2 mm, each comprising an aluminium bronze layer and a magnesium zirconate layer. The foil remains flexible if the direction of bending is aligned with the air gaps in the ceramic layer so that the foil can be used to wrap around or be moulded onto components or surfaces.

The air gaps between the ceramic squares add to the overall thermal performance, but also provide significant physical flexibility.

According to one aspect of the invention there is provided a heat shield comprising a metal sheet with a thermal sprayed layer of ceramic material thereon, the sheet defining an array of dimples and/or pimples such that any notional plane intersecting the coated surface of the metal sheet creates a notional line of intersection which intersects at least some dimples and/or pimples.

If a ceramic coating is applied to a flat sheet of backing material, then the ceramic coating is likely to crack and/or become damaged or detach if the backing material is bent or significantly flexed. The inventors have recognised, surprisingly, that if the metal sheet defines an array of dimples and/or pimples, as claimed, then a ceramic coating can be used as a continuous layer, and a heat shield with this construction can undergo significant forming and bending without obvious damage to the ceramic layer, even though the ceramic is itself relatively brittle. The shape of the metal sheet helps to limit both the tensile and compressive stress within the coating, and allow any necessary deformation of the substrate and ceramic to be spread across a wider area. There is then sufficient "flexibility" within the ceramic layer to accommodate this deformation without failure of the ceramic.

The array of dimples and/or pimples may be irregular, but in a preferred embodiment the array is a regular array. The regular array may take any suitable form and may be a rectangular array or a hexagonal array, for example, or a parquet flooring type array.

In one embodiment, the array comprises a repeating pattern of a dimple surrounded by a plurality of pimples or a pimple surrounded by a plurality of dimples. In a particular embodiment, the pattern may comprise a dimple surrounded by six pimples or a pimple surrounded by six dimples.

Each dimple or pimple may be of any suitable shape and may be, for example, square, hexagonal or rectangular, but preferably each dimple is generally rounded, and may be elliptical, but preferably is round in plan. Indeed, each dimple or pimple may be substantially hemispherical.

Each dimple or pimple may be deeper than the half of the thickness of the metal sheet and preferably each dimple or pimple is deeper than the thickness of the metal sheet. The aspect ratio (depth relative to width) of each dimple or pimple may be less than one and preferably is less than 0.3. Each dimple or pimple may be up to 1 mm deep and may be more than 0.2 mm deep. Each dimple or pimple may be less than 10 mm in diameter.

The layer of ceramic material may be less than 1 mm thick.

The metal sheet may comprise wholly or principally at least one of the group comprising steel, aluminium, titanium, copper, bronze and nickel chrome alloys.

The ceramic material may comprise wholly or principally at least one of the group comprising titania, zirconia and alumina. The porosity of the ceramic material may be at least 3%, preferably at least 5%, and in one embodiment at least 10%, prior to any subsequent treatment processes.

The heat shield may be flat, but in another embodiment, the heat shield is non-flat and may be shaped, for example to fit onto or around a component such as a car manifold, catalytic converter or silencer.

According to another aspect of the invention there is provided a heat shield assembly comprising a heat shield according to the first aspect of the invention and a further sheet attached thereto.

This will result in air being trapped in the dimples or pimples, which will increase the thermal performance of the heat shield, in view of the fact that static, non-convecting air is a very poor conductor of heat.

A further sheet may be another heat shield according to the first aspect of the invention. In another embodiment, the further sheet is a sheet of metal foil.

According to a further aspect of the invention there is provided a method of making a heat shield according to the first aspect of the invention, the method comprising: taking a metal sheet, impressing dimples and/or pimples thereinto, and thermal spraying the metal sheet with ceramic material to form a ceramic layer.

The ceramic material may be thermal sprayed directly on to the metal sheet, or in one embodiment a metal bond coat is applied to the metal sheet, and then the ceramic layer is thermal sprayed on to the bond coat on the metal sheet. The use of a bond coat can improve the adherence of the ceramic layer to the metal sheet.

The metal sheet may be cut to size before the ceramic material is thermal sprayed.

The heat shield may be flat, or in an alternative embodiment, the metal sheet is bent into a desired shape before the ceramic material is thermal sprayed. In this way, the heat shield can be bent to a desired shape, for example to fit a specific component, such as a car manifold, catalytic converter or silencer. The flexibility in the heat shield provided by the present invention then provides a means by which the heat shield can be further moulded, bent or flexed during any subsequent fitting operation. According to another aspect of the invention there is provided a heat shield comprising a metal sheet with a thermal sprayed layer of ceramic material thereon, the sheet defining an array of dimples and/or pimples such that any fold line created by folding the heat shield will intersect at least some of the dimples and/or pimples thereof.

Embodiments of the invention will now be described by way of example and with reference to the accompanying drawings, in which.

Figure 1:
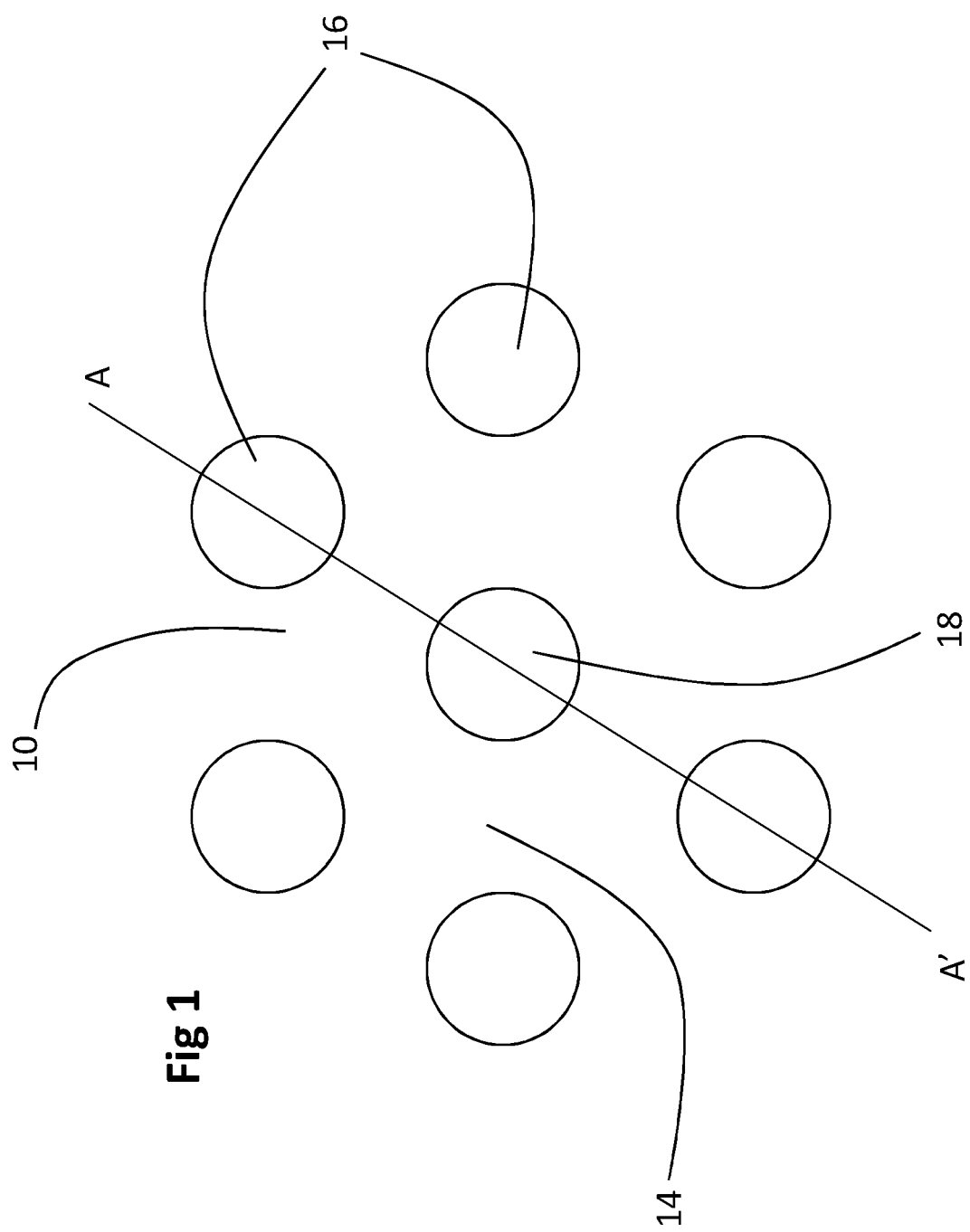
FIG. 1 is a plan view showing the dimple pattern in a heat shield in a first embodiment.
Figure 2:
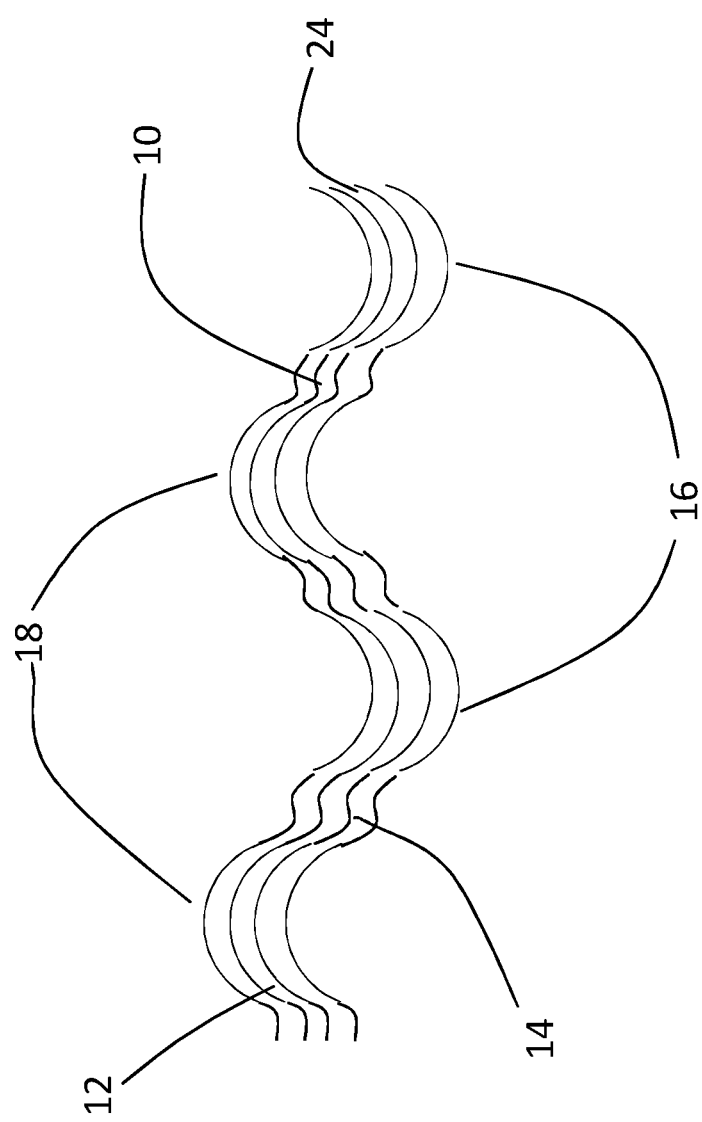
FIG. 2 is an elevation in cross-section at A-A' in FIG. 1.

FIGS. 1 and 2 show the heat shield 10 of the first embodiment. The heat shield 10 comprises a stainless steel sheet 12 with a plasma sprayed ceramic coating 14.

To make the heat shield 10, a 0.3 mm thick, flat sheet 12 of stainless steel, type 304, was taken and sixteen dimples 16 were pressed into it. The dimples 16 were arranged in an equally spaced hexagonal array. Dimples were impressed from both sides, so that in the pattern, there are six depressed dimples 16 in a hexagonal pattern around a central raised pimple 18. Each dimple 16 and pimple 18 is round in plan and substantially part spherical overall. Each dimple 16 and pimple 18 is 0.4 mm deep. This creates an overall sheet thickness of about 1.1 mm when measured peak to peak from a peak of a pimple to the peak of a dimple in the direction perpendicular to the plane of the sheet 12. The spacing between the centres of adjacent dimples 16 is the same as the spacing between an adjacent dimple 16 and pimple 18, and is 5 mm in this embodiment.

The dimpled sheet 12 is then plasma spray coated. Before coating, the sheet 12 is thoroughly degreased, using acetone. The sheet is grit blasted to give a rough surface, using a siphon-type grit blast system at 2.76 bar (40 psi) with 0.4 to 0.5 mm aluminium oxide grit.

The roughened sheet 12 is mounted in a rotating chuck, in a plasma spray booth equipped with a robot manipulation system. A nickel based bond coat 24 of nickel chromium aluminium alloy is plasma sprayed onto the sheet 12 to a thickness of 0.1 mm. The alloy composition is 70% Ni, 18% Cr, 6% Al, up to 6% other. The plasma spray parameters used are nitrogen 50 slpm, hydrogen 5 slpm, current 400 Amps, carrier gas 5 slpm, spray distance 100 mm, powder flow 45 g/min.

The ceramic layer 14 is then plasma sprayed on to the metal bond coat to a thickness of 0.2 mm. The ceramic material is magnesia stabilised zirconia. The porosity of the resulting ceramic layer is about 10%.

As illustrated in FIG. 2, no part of the heat shield 10 is flat, so if an attempt is made to bend the sheet, the fold line will never be, and cannot be along a flat part of the sheet because there is none. The dimpled and pimpled arrangement helps to limit the tensile and compressive stress within the ceramic layer 14, allowing any necessary deformation of the sheet 12 and ceramic layer 14 to be spread across a wider area.

The heat shield 10 thus created can be easily cut using a workshop guillotine, and by hand using snippers, without causing damage to the ceramic thermal barrier layer 14.

The heat shield 10 was then bent around a 35 mm diameter bar to an angle of 90°, and then manually straightened. This exercise was repeated twenty times, and the heat shield 10 was then inspected. There was no visible damage to the ceramic coating 14, or to the underlying metal sheet 12, after the full twenty cycles.

A second sample of the heat shield 10 was then bent around a sharp 90° angle and subsequently hand straightened, and once again this exercise was repeated twenty times over. The ceramic coating 14 remained intact.

In the case of a contact heat shield application, the dimpled structure ensures only minimal point-to-point contact with the heat source whilst also introducing thermally insulating air pockets. The introduction of a ceramic coating 14 further reduces the thermal contact between the hot component and heat shield 10, resulting in much reduced conductive heat transfer.

In the case of an off-set heat shield 10 the ceramic coating 14 serves to help reduce conduction from the hot side to cold side of the heat shield 10. It is recognised that heat transfer to the hot-side of the heat shield 10 will be via a combination of radiation and convection.

The inventors have realised that the application of a continuous ceramic coating 14 to a dimpled metal sheet 12 will give rise to significant flexibility, allowing the ceramic coated heat shield 10 to be subsequently formed, moulded and bent without impacting overall heat shield integrity. This opens up the opportunity to produce a rigid yet fully formable ceramic heat shield material.

It is known that some of the "flexibility" of the ceramic 14 is delivered by the action of micro-cracks that do not themselves result in gross-failure of the ceramic layer 14, though the use of a dimpled metal sheet 12 serves to minimise the severity of this micro-cracking on the structural integrity of the ceramic thermal barrier layer 14 by ensuring it is spread across a wider area and not focussed on just a narrow band where micro-cracking could be more severe.

In a further embodiment, a sample was prepared in the same way as the heat shield 10 of the first embodiment, but this time the nickel based bond layer was applied to both sides of the sheet 12, and the ceramic layer 14 was plasma sprayed on to both sides of the sheet 12 as well.

Once again it was found that the heat shield 10 could be easily cut using a workshop guillotine, and by hand using snippers, without causing damage to the ceramic layer 14. Both bend tests were carried out on the heat shield 10 of the second embodiment, and once again there was no damage after twenty cycles of bending around a 35 mm diameter bar. Following bending around the sharp angle, some minor surface deterioration became apparent after nine cycles, but the coating of ceramic 14 remained intact.

Figure 3:
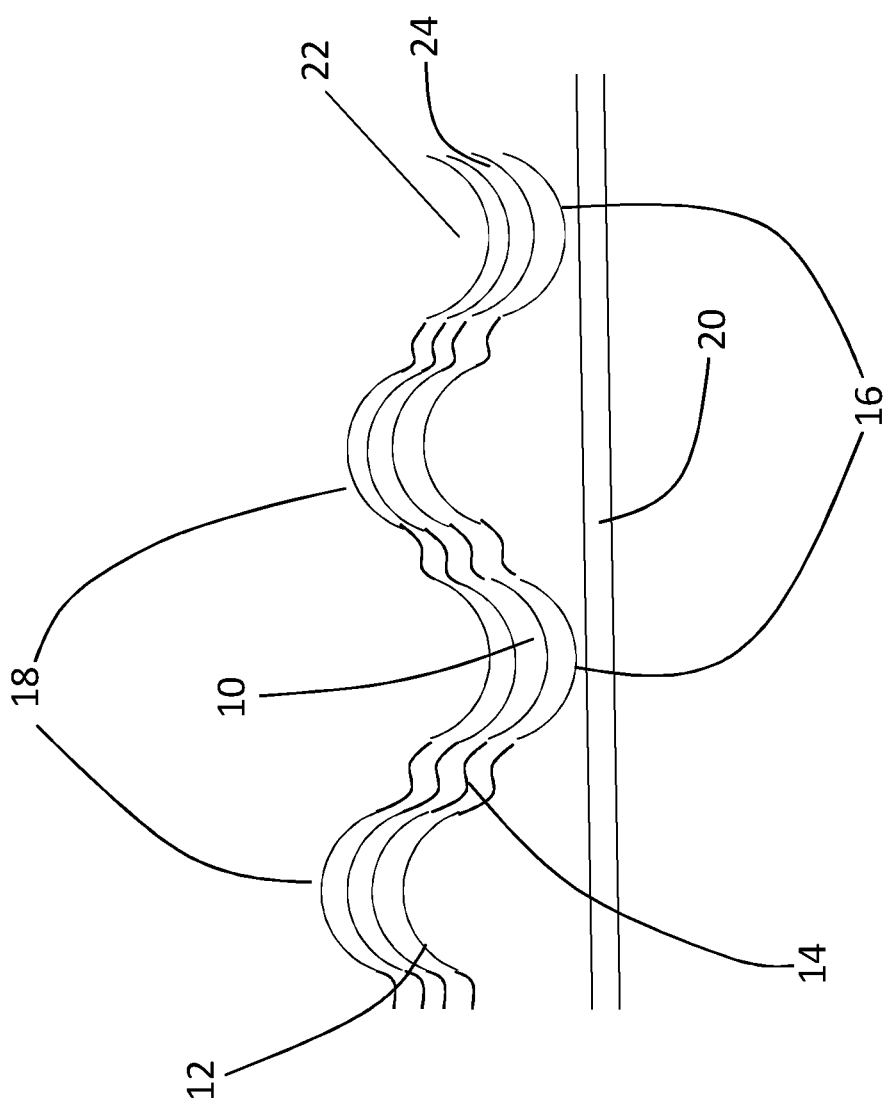
FIG. 3 is a plan view of a heat shield in a third embodiment.

FIG. 3 shows a variation on the first embodiment. In this third embodiment, the heat shield 10 of the first embodiment is attached to a sheet of foil 20 to form a heat shield assembly 22. The foil 20 may be aluminium foil and be attached to the peaks of the dimples 16 of the bare metal side of the heat shield 10 by adhesive. This will limit airflow and hence create an insulating volume of trapped air.

Figure 4:
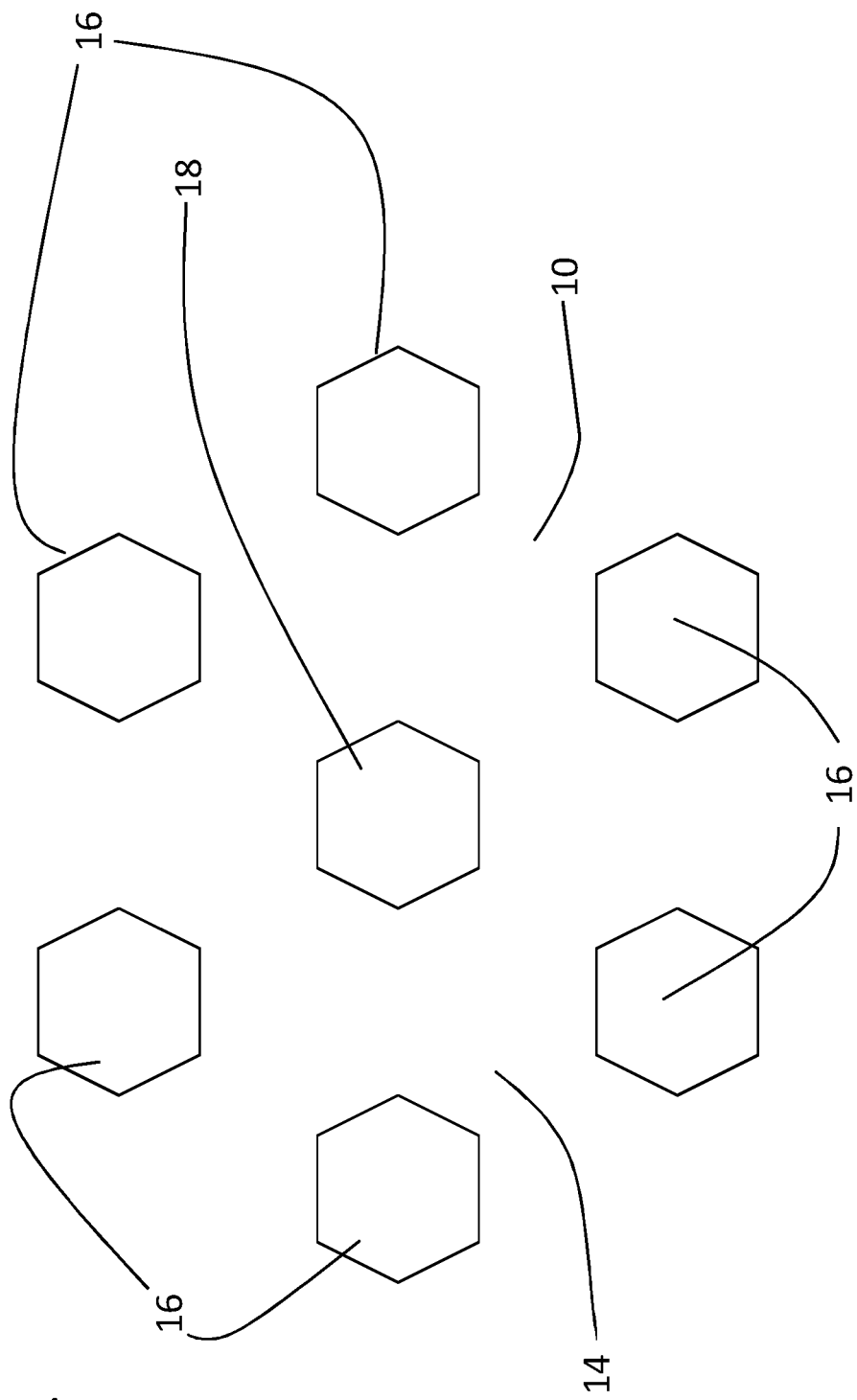
FIG. 4 is a plan view of a heat shield in a fourth embodiment.

FIG. 4 shows a fourth embodiment, which is similar to the first embodiment except that the dimples 16 and pimples 18 are hexagonal rather than round.

Figure 5:
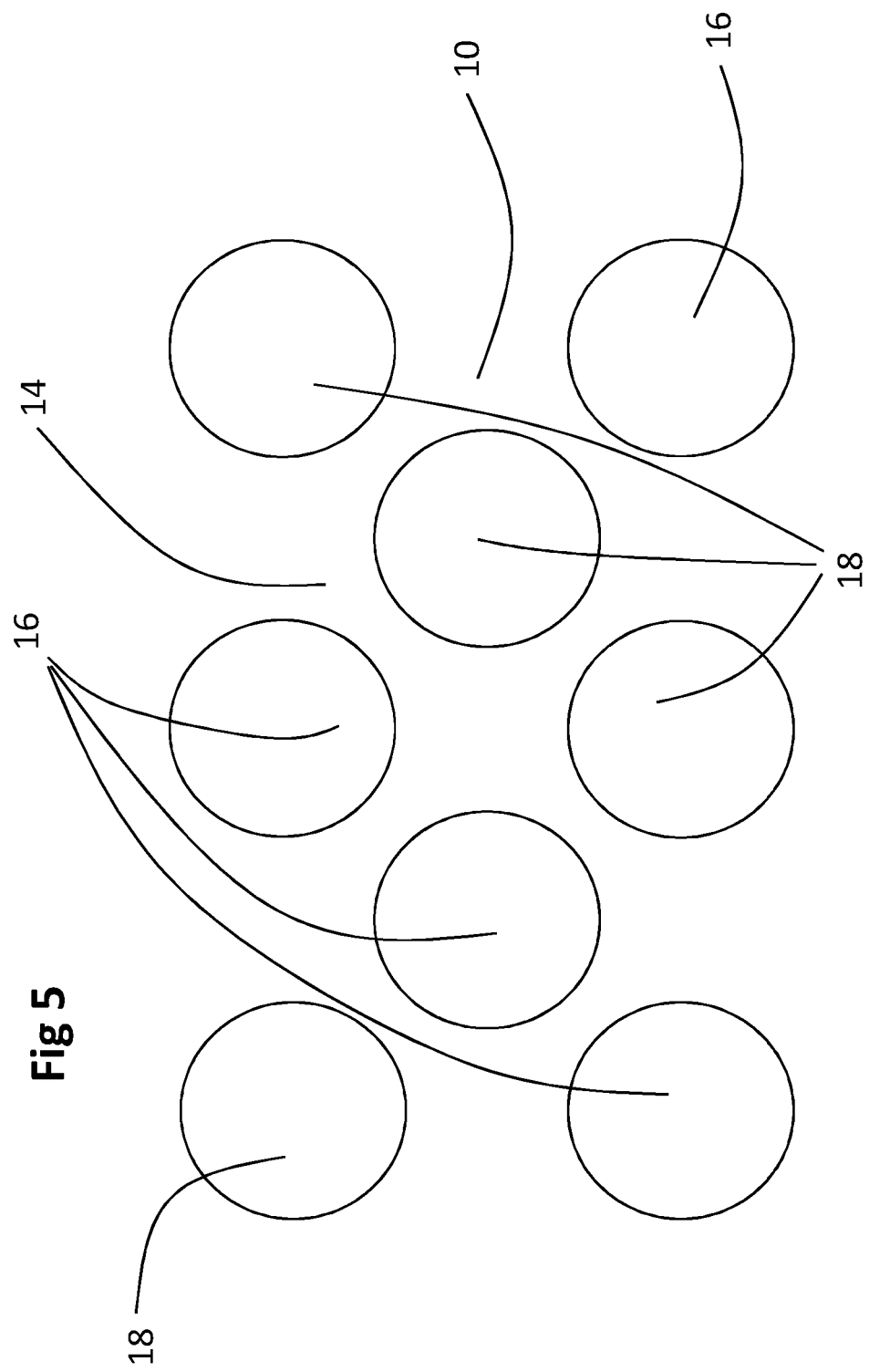
FIG. 5 is a plan view of a heat shield in a fifth embodiment.

FIG. 5 shows a fifth embodiment in which the dimples 16 and pimples 18 are round in plan and in alternating diagonal lines. Thus there is a diagonal line of dimples 16 followed by a diagonal line of pimples 18 and the pattern repeats. The dimples 16 and pimples 18 are 0.5 mm deep with 4 mm between centres.

Figure 6:
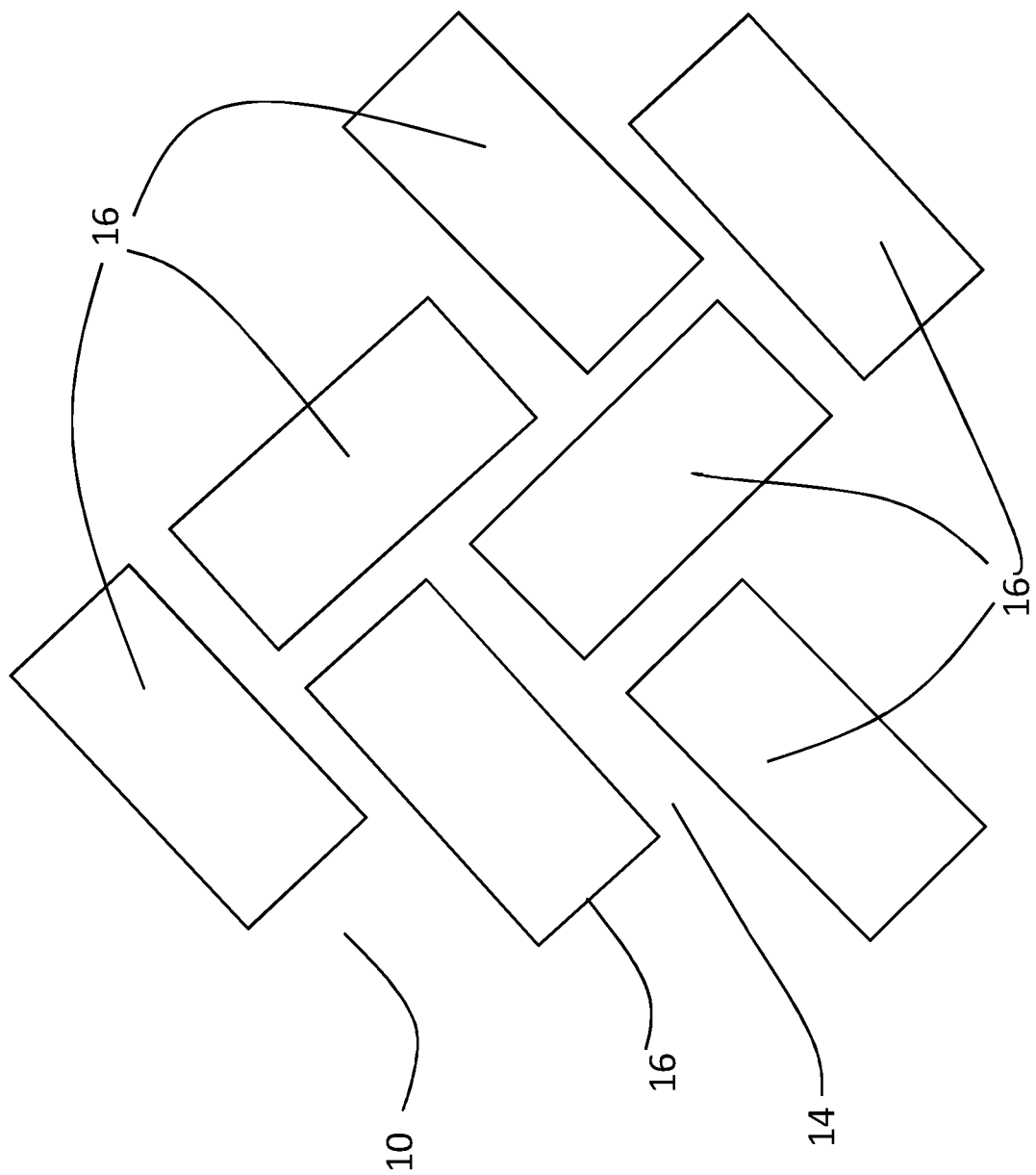
FIG. 6 is a plan view of a heat shield in a sixth embodiment.

FIG. 6 shows a sixth embodiment in which there are only dimples 16, and each dimple 16 is rectangular. The dimples 16 are arranged in a regular array in the same style as parquet flooring. Hence the dimples 16 are in a herringbone arrangement overlapping with each other. It will be seen that any plane intersecting the heat shield 10 of this embodiment will inevitably intersect a plurality of dimples.

Figure 7:
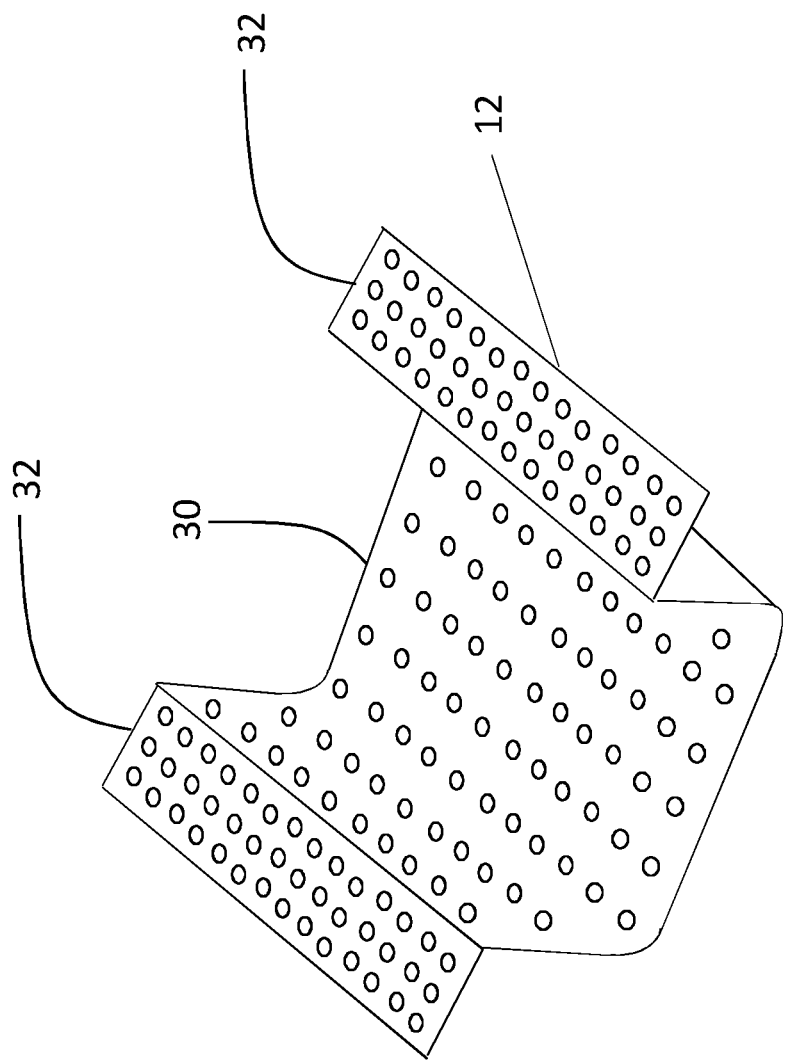

FIG. 7 shows a seventh embodiment. The metal sheet 12 of the first embodiment with the bond coat 24 sprayed thereon, has been taken and bent to form a main, U-shaped part 30 with an outturned flange 32 at the end of each arm 34. The ceramic layer 14 is then plasma sprayed onto the bond coat 24 on the bent metal sheet 12. The heat shield 10 of this embodiment can be arranged over a component (not shown) and attached into place using the flanges 32 so that the component is shielded from heat by the main part 30.

Figure 8:
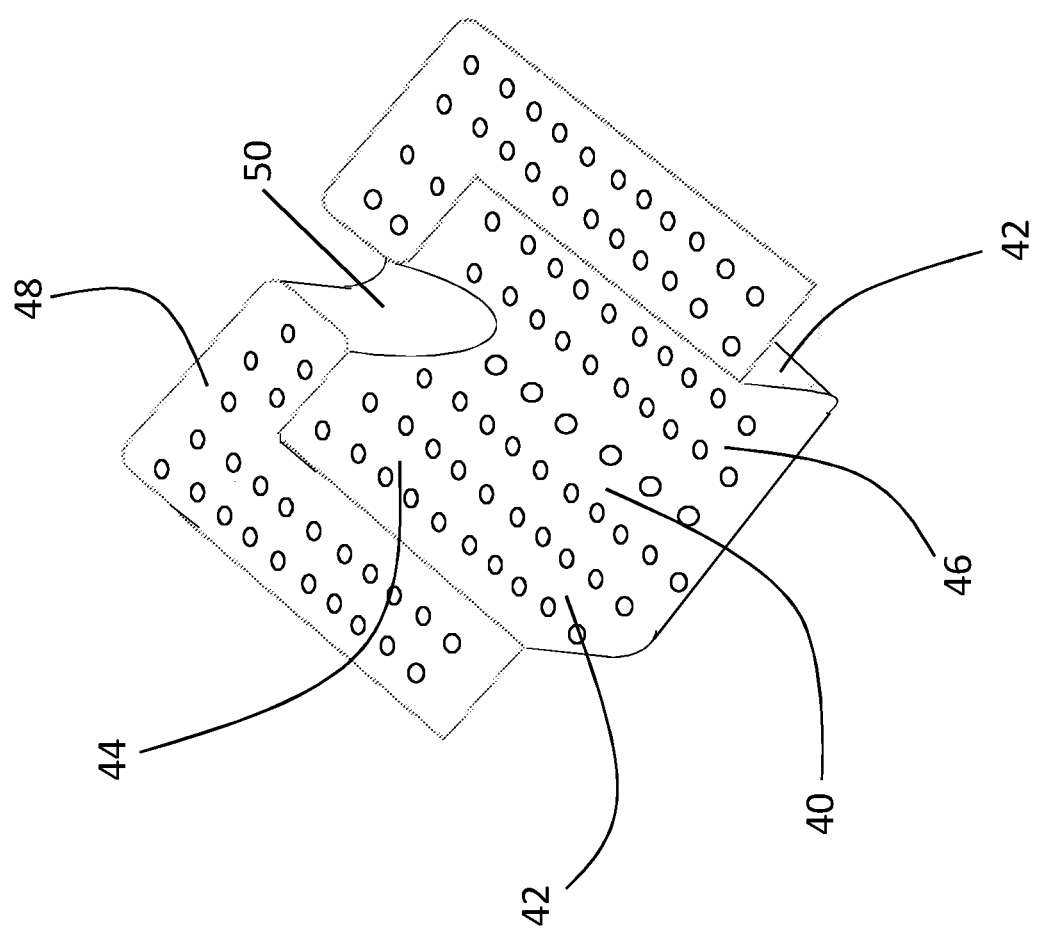

FIG. 8 shows another shaped heat shield 10 in a further embodiment. In this case, a flat metal sheet 12 having dimples 16 and pimples 18 in accordance with the pattern shown in FIG. 4 is placed in a press. The press presses the sheet 12 into shape. A bond coat 24 is then sprayed on, followed by the ceramic coat 14. The formed shape of the sheet 12 is generally in the shape of a deep tray with one end missing. Thus there is a main cavity 40 defined by two side walls 42, and an end wall 44 and a floor 46. There is a flange 48 around the top of the walls 42, 44. At the end 44 opposite the end which is cut off, there is a deep U-shaped depression 50 into the flange 48 and into the end wall 44, which almost reaches the floor 46 of the sheet 12.

The heat shield 10 of this embodiment might be used to shield a silencer on a vehicle. The flange 48 can be used to locate and attach the heat shield 10. The pipe leading to the silencer will pass through the deep depression 50, while the silencer will be accommodated within the main cavity 40 of the heat shield 10.

Figure 9:
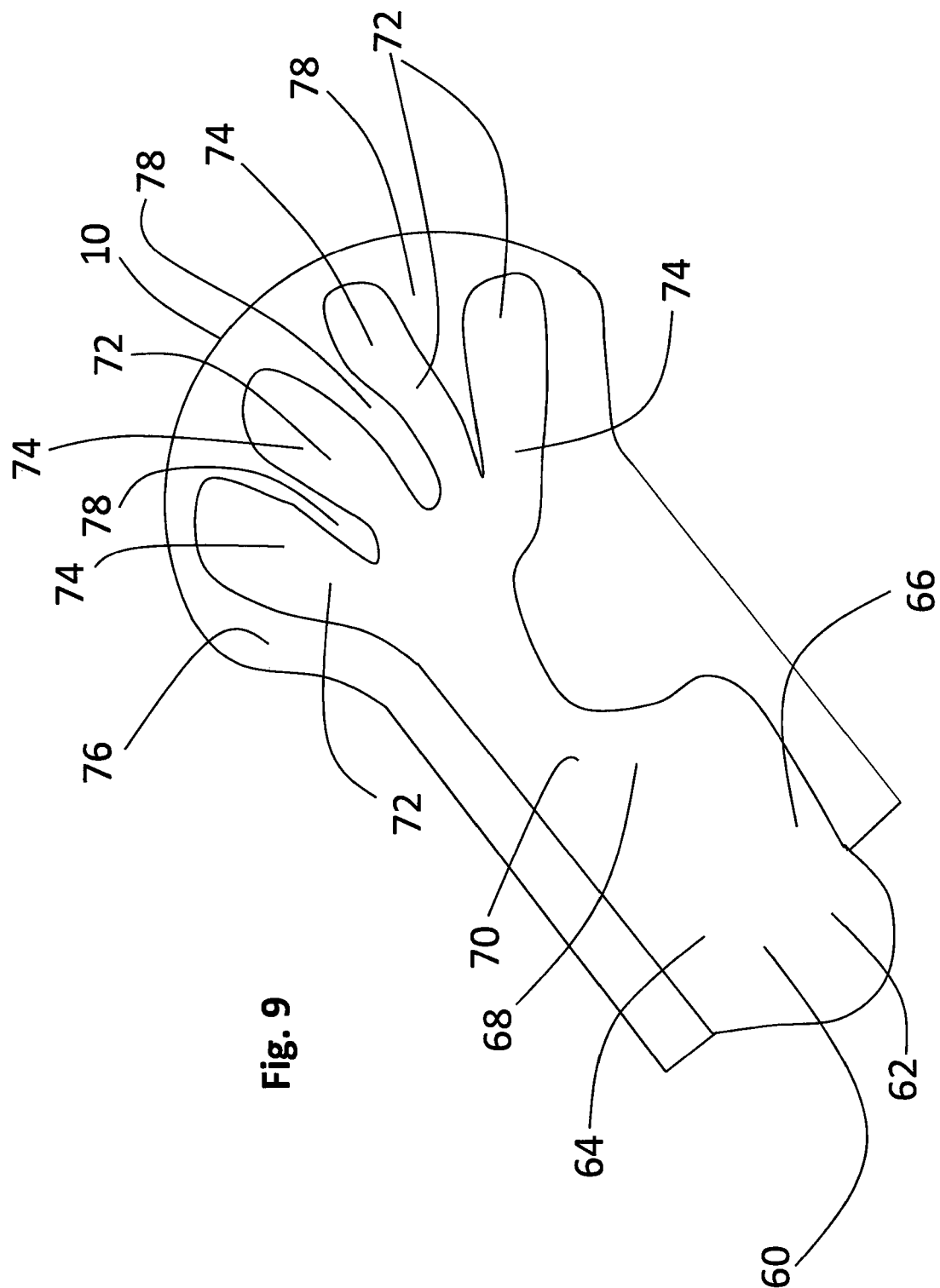

FIG. 9 shows a heat shield 10 for shielding an exhaust manifold (not shown). As in the previous embodiments, there is a cavity 60 which is shaped to receive the component. In this case, from an open end 62 of the heat shield 10, there is a channel shaped part 64 defining a wider area 66 which connects to a narrower channel shaped part 68 defining a necked section 70 leading four separate channels 72 defining four individual branches 74. Each branch channel 72 can receive an individual exhaust pipe of an exhaust system from an engine block. The exhaust pipes then come together and pass through the necked section 70 and the wider channel 64. As in the other embodiments, there is a flat flange 76 around the part of the heat shield 10 defining the cavities 66, 70, 74. In the present embodiment there are also a flat areas 78 coplanar with the flange 76 which extend between the branch channels 72.

The invention claimed is:

1. A heat shield comprising a metal sheet with a thermal sprayed layer of ceramic material thereon, the sheet defining an array of at least one of dimples and pimples such that any notional plane intersecting the coated surface of the metal sheet creates a notional line of intersection which intersects at least some dimples and/or pimples.

2. A heat shield as claimed in claim 1, wherein the array of at least one of dimples and pimples is a regular array.

3. A heat shield as claimed in claim 2, wherein the regular array is a rectangular array.

4. A heat shield as claimed in claim 2, wherein the regular array is a hexagonal array.

5. A heat shield as claimed in claim 2, wherein the regular array is a herringbone parquet flooring type array.

6. A heat shield as claimed in claim 2, wherein the regular array comprises a repeating pattern of a dimple surrounded by a plurality of pimples or a pimple surrounded by a plurality of dimples.

7. A heat shield as claimed in claim 6, wherein the regular array comprises a repeating pattern of a dimple surrounded by six pimples or a pimple surrounded by six dimples.

8. A heat shield as claimed in claim 1, wherein each of the at least one of dimples and pimples is in a shape selected from the group consisting of square, hexagonal and rectangular.

9. A heat shield as claimed in claim 1, wherein each of the at least one of dimples and pimples is generally rounded.

10. A heat shield as claimed in claim 9, wherein each of the at least one of dimples and pimples is round in plan.

11. A heat shield as claimed in claim 10, wherein each of the at least one of dimples and pimples is substantially hemispherical.

12. A heat shield as claimed in claim 1, wherein each of the at least one of dimples and pimples is deeper than the half of the thickness of the metal sheet.

13. A heat shield as claimed in claim 1, wherein each of the at least one of dimples and pimples is deeper than the thickness of the metal sheet.

14. A heat shield as claimed in claim 1, wherein the aspect ratio of each of the at least one of dimples and pimples is less than one.

15. A heat shield as claimed in claim 1, wherein the aspect ratio of each of the at least one of dimples and pimples is less than 0.3.

16. A heat shield as claimed in claim 1, wherein each of the at least one of dimples and pimples is up to 1 mm deep.

17. A heat shield as claimed in claim 1, wherein each of the at least one of dimples and pimples is more than 0.2 mm deep.

18. A heat shield as claimed in claim 1, wherein each of the at least one of dimples and pimples is less than 10 mm in diameter.

19. A heat shield as claimed in claim 1, wherein the layer of ceramic material is less than 1 mm thick.

20. A heat shield as claimed in claim 1, wherein the metal sheet comprises wholly or principally at least one of the group comprising steel, aluminium, titanium, copper, bronze, and nickel chrome alloys.

21. A heat shield as claimed in claim 1, wherein the ceramic material comprises wholly or principally at least one of the group comprising titanic, zirconia and alumina.

22. A heat shield as claimed in claim 1, wherein the porosity of the ceramic material is at least 3%.

23. A heat shield as claimed in claim 1, wherein the porosity of the ceramic material is at least 5%.

24. A heat shield as claimed in claim 1, wherein the porosity of the ceramic material is at least 10%.

25. A heat shield as claimed in claim 1, wherein the heat shield is non-flat.

26. A heat shield as claimed in claim 25, wherein the heat shield is shaped to fit onto or around a component, such as a car manifold, catalytic converter or silencer.

27. A heat shield assembly comprising a heat shield as claimed in claim 1 and a further sheet attached thereto.

28. A heat shield assembly as claimed in claim 27, wherein the further sheet is another heat shield as claimed in claim 1.

29. A heat shield assembly as claimed in claim 27, wherein the further sheet is a sheet of metal foil.

30. A method of making a heat shield or heat shield assembly as claimed in claim 1, the method comprising:
   taking a metal sheet and pressing the at least one of dimples and pimples thereinto, and thermal spraying a metal sheet with ceramic material to form a ceramic layer.

31. A method as claimed in claim 30, wherein a metal bond coat is applied to the metal sheet and then the ceramic layer is thermal sprayed on to the bond coat on the metal sheet.

32. A method as claimed in claim 31, wherein the metal sheet is cut to size before the ceramic material is thermal sprayed.

33. A method as claimed in claim 30, wherein the metal sheet is bent into a desired shape before the ceramic material is thermal sprayed.

* * * * *